United States Patent
Andrick et al.

(10) Patent No.: US 7,401,791 B2
(45) Date of Patent: Jul. 22, 2008

(54) GASKET WITH LOCKING LUGS

(75) Inventors: William C. Andrick, North Canton, OH (US); Michael J. Ferrara, Jr., Ravenna, OH (US)

(73) Assignee: Vertex, Inc., Mogadore, OH (US)

(*) Notice: Subject to any disclaimer, the term of this patent is extended or adjusted under 35 U.S.C. 154(b) by 346 days.

(21) Appl. No.: 11/067,839

(22) Filed: Feb. 28, 2005

(65) Prior Publication Data

US 2006/0192348 A1 Aug. 31, 2006

(51) Int. Cl.
*F16L 21/025* (2006.01)
(52) U.S. Cl. .................. 277/604; 277/615; 277/626; 285/344
(58) Field of Classification Search .......... 277/602, 277/604, 605, 615, 910, 626; 285/344, 231
See application file for complete search history.

(56) References Cited

U.S. PATENT DOCUMENTS

| | | | | |
|---|---|---|---|---|
| 2,247,609 A * | 7/1941 | Devibiss | ............... | 277/626 |
| 2,793,428 A * | 5/1957 | Witte | ............... | 29/451 |
| 2,832,614 A * | 4/1958 | Settle, Jr. | ............... | 277/604 |
| 2,873,132 A * | 2/1959 | Tanner | ............... | 277/436 |
| 3,257,719 A | 6/1966 | Larkfeldt | | |
| 3,396,974 A | 8/1968 | Nord | | |
| 3,510,139 A * | 5/1970 | Potter | ............... | 277/603 |
| 3,542,377 A * | 11/1970 | Voitik | ............... | 277/380 |
| 3,584,889 A * | 6/1971 | Sheets | ............... | 277/626 |
| 3,647,229 A | 3/1972 | Grimes | | |
| 3,712,631 A * | 1/1973 | Forchini et al. | ............... | 277/605 |
| 3,756,126 A * | 9/1973 | Granada | ............... | 92/38 |
| 3,951,420 A | 4/1976 | Gritzka | | |
| 4,336,946 A * | 6/1982 | Wheeler | ............... | 277/529 |
| 4,350,350 A | 9/1982 | Blakeley | | |
| 4,368,894 A | 1/1983 | Parmann | | |
| 5,687,976 A | 11/1997 | Andrick et al. | | |
| 6,357,760 B1 * | 3/2002 | Doyle | ............... | 277/604 |
| 6,612,585 B2 * | 9/2003 | Grabe | ............... | 277/626 |
| 6,688,608 B2 * | 2/2004 | Doyle | ............... | 277/604 |
| 6,719,302 B2 | 4/2004 | Andrick | | |
| 2003/0090106 A1 | 5/2003 | Goodard et al. | | |
| 2004/0222597 A1 | 11/2004 | Benecke | | |

OTHER PUBLICATIONS

SuperSeal™ Overview; Product Selection Guide; Internet website: http://www.semcoinc.com/Products.nsf/o/2A7B11446795974886256F1D0044BE64?Edit...; Nov. 29, 2004.

* cited by examiner

*Primary Examiner*—William L. Miller
(74) *Attorney, Agent, or Firm*—Fay Sharpe LLP (57) ABSTRACT

A pipe gasket includes a toroidal gasket body and projections extending away from a peripheral surface of the gasket body. The gasket body is configured to allow the gasket body to roll along a spigot end of a first pipe as the spigot end is received inside a bell end of a second pipe. The projections each include a first surface and a second surface. The first surface is configured to facilitate rotation of the gasket body in a first rotational direction. The second surface is configured to inhibit rotation of the gasket body in a second, opposite, rotational direction.

24 Claims, 5 Drawing Sheets

GASKET WITH LOCKING LUGS

BACKGROUND

The use of gaskets in bell and spigot pipe joints is well known. These gaskets are typically ring-shaped and are stretched around a spigot end of a first pipe. The spigot end is then inserted into a bell end of a second pipe. The pipes can be made from numerous materials, but most commonly are made from concrete or plastic. It is common practice to utilize a surface lubricant to facilitate the jointing of the pipe and gasket.

In a pipe joint that uses a gasket known as a "rolling gasket," as the spigot end is inserted into the bell end, there is an annular space between an external surface of the spigot and an internal surface of the bell. The gasket has a cross section larger than this clearance. Thus, the gasket rolls along the surfaces of the pipe ends until the first pipe is pushed home. The home position is where an annular end of the first pipe contacts an annular inner shoulder of the second pipe and an annular end of the second pipe contacts an annular outer shoulder of the first pipe.

Some of the known cross sections for rolling gaskets include a circular cross section, a teardrop-shaped cross section, and a D-shaped cross section. The circular gasket is a typical O-ring gasket. O-ring gaskets have been known to "back out" of a pipe joint. This happens when a movement of the pipes and/or forces on the pipes results in the O-ring gasket moving out of the joint area. Teardrop-shaped and D-shaped gaskets were introduced to overcome the disadvantage of the O-ring gasket's tendency to back out; however, these shapes were far enough removed from a circular cross section that is was hard to get these gaskets to roll evenly when inserting the spigot into the bell. A gasket that is difficult to roll can result in rotational misalignment. But, lubrication of the joint requires an additional step during pipe installation, which adds to the cost of the installation.

Accordingly, it is desirable to provide a gasket that rolls evenly when a spigot end of a pipe is inserted into a bell end of a pipe, while at the same time configuring the gasket to inhibit it from "backing out" of a pipe joint. Furthermore, eliminating the need for surface lubricants provides cost savings in time and material.

BRIEF DESCRIPTION

According to one embodiment, such a gasket includes a toroidal gasket body and projections extending away from a peripheral surface of the gasket body. The gasket body is configured to allow the gasket body to roll along a spigot end of a first pipe as the spigot end is received inside a bell end of a second pipe. Each of the at least two projections includes a first surface and a second surface, and each surface extends away from the peripheral surface at an angle. The first surface is configured to facilitate rotation of the gasket body in a first rotational direction. The second surface is configured to inhibit rotation of the gasket body in a second, opposite, rotational direction.

According to another embodiment, a directional pipe gasket for a bell and spigot pipe joint includes a gasket body formed of a flexible material and/or a combination of softer and harder flexible materials. The gasket includes at least two locking projections extending away from a periphery of the gasket body. The at least two locking projections are configured to allow a rolling of the gasket body in a first rotational direction along a spigot end of a first associated pipe as the spigot end is received inside a bell end of a second associated pipe. Each of the locking projections has substantially the same dimensions.

According to another embodiment, a directional pipe gasket includes a toroidal gasket body having a peripheral surface that is spaced by a first substantially constant radius from an interior point of the body and n locking projections protruding away from the peripheral surface. The locking projections are angularly displaced from one another around the peripheral surface and each includes an apex that is spaced a second substantially constant radius from the interior point of the body. The second radius is greater than the first radius but the second radius is small enough to allow the gasket body to roll along a spigot end of the first associated pipe when the spigot end is received inside the bell end of the second associate pipe.

DETAILED DESCRIPTION

Figure 1A:
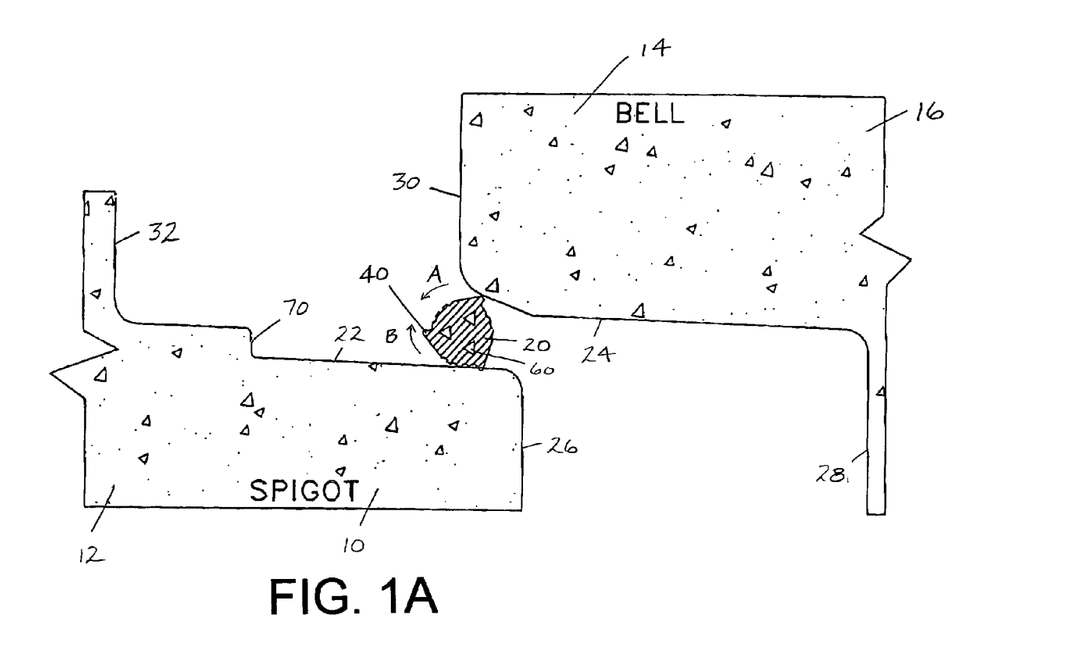
FIG. 1A is cross-sectional view of an unassembled modified single offset bell and spigot pipe joint depicting a spigot end of a first pipe prior to full insertion into a bell end of a second pipe, where a gasket according to an embodiment of the present invention is positioned around the spigot end.

With reference to FIG. 1A, a spigot end 10 of a first pipe 12 is shown prior to receipt inside a bell end 14 of a second pipe 16. A gasket 20 is stretched around an outer surface 22 of the spigot end 10. The pipes 12 and 16 depicted are concrete pipes; however, the gasket 20 can be used with bell and spigot pipes made from other materials, such as plastic, and other conventional materials. Moreover, the gasket can be used to seal between other types of pipes as well. The cross section of the pipes can be circular, elliptical, box-shaped, etc. The gasket 20 can be made from a flexible material, such as rubber, and/or a combination of softer and harder flexible materials. Instead of known elastomers such as rubber, other conventional materials which can be used include thermoplastic rubber ("TPR") and thermoplastic elastomer ("TPE").

Figure 1B:
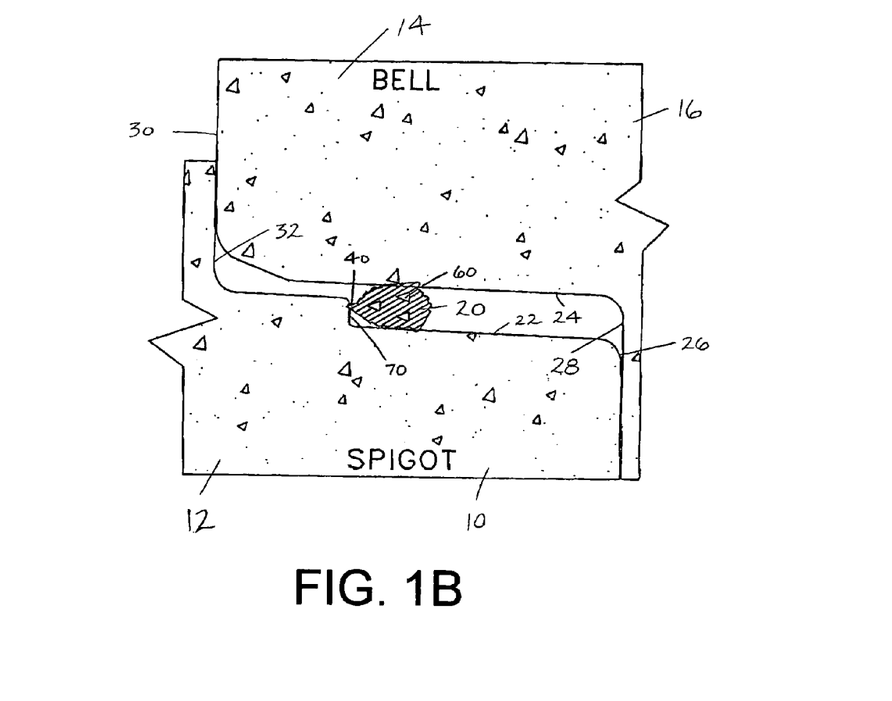
FIG. 1B is a cross-sectional view of an assembled modified single offset bell and spigot pipe joint in the home position where the spigot end of the first pipe is fully inserted into the bell end of the second pipe.

With reference to FIG. 1B, an assembled pipe joint is shown where the spigot end 10 of the first pipe 12 is fully received inside the bell end 14 of the second pipe 16, either by inserting the spigot end into the bell end or by moving the second pipe so that the bell end receives the spigot end. FIG. 1B depicts the pipe joint in the home position. For the sake of brevity throughout the remainder of the description, the receipt of a spigot end inside a bell end will be described as inserting the spigot end into the bell end; however, it should be understood that the bell end can be moved to receive the spigot end.

With reference to FIG. 1A, prior to insertion of the spigot end 10 into the bell end 14, an inner surface 24 of the bell end 14 contacts the gasket 20. Accordingly, the gasket 20 has a maximum cross section that is greater than the clearance between the outer surface 22 of the spigot end 10 and the inner surface 24 of the bell end 14. During insertion of the spigot end 10 into the bell end 14, the relative movement of the bell end and spigot end causes the gasket to roll between the outer surface 22 of the spigot end 10 and the inner surface 24 of the bell end 14 until the pipes are pushed home. The home position is where an annular end surface 26 of the first pipe 12 contacts an inner annular shoulder surface 28 of the second pipe and an annular end surface 30 of the second pipe 16 contacts an outer annular shoulder surface 32 of the first pipe 12. During insertion, the gasket 20 rolls counter-clockwise, in the rotational direction of arrow A. The gasket 20 is configured to facilitate rotation of the gasket in the counter-clockwise direction and inhibit rotation in the clockwise direction shown by arrow B. By enabling rotation in the counter-clockwise direction of arrow A, installation lubrication for the gasket 20 is not needed, which lowers the cost of installation. By inhibiting rotation in the clockwise direction of arrow B, "backing out" of the gasket is inhibited.

To inhibit rotation of the gasket in the direction of arrow B, while allowing rotation of the gasket in the direction of arrow A, the gasket 20 is provided with a plurality of locking projections, or locking lugs 40. For the embodiment of the gasket depicted in FIG. 2, the gasket 20 includes a toroidal gasket body 42 having a substantially circular peripheral surface 44 in cross section. The projections 40 are spaced around the periphery of the gasket. Each projection runs along the toroidal body, i.e. extends ring-like along at least a major portion of the gasket body. In the embodiment depicted in FIG. 2, the peripheral surface 44 is spaced a constant radius $r_1$ from a central axis 46 of the cross section of the gasket body 42. In alternative embodiments, the peripheral surface 44 can be spaced an approximately constant radius from a central axis of the gasket body. In these configurations, such as some of those depicted in FIGS. 3A-3M, the gasket body can take a generally polygonal configuration in cross section. A constant radius, or approximately constant radius, for the peripheral surface 44 facilitates the rolling action of the gasket 20 along the pipe ends.

The locking projections 40 protrude away from the peripheral surface 44 of the body 42. In the embodiment depicted in FIG. 2, the locking projections are angularly spaced around the peripheral surface. More particularly, three locking projections are shown approximately equally spaced by about 120° from one another. Such approximately equal spacing, where n is the number of projections and the angular spacing equals about n/360°, facilitates manufacturing of the gasket because the extrusion tools used to make the gaskets are balanced. Nevertheless, the angular spacing between adjacent projections need not be the same. Moreover, fewer or greater numbers of projections than the illustrated three projections can be provided, as shown in FIGS. 3A-3M.

Figure 2:
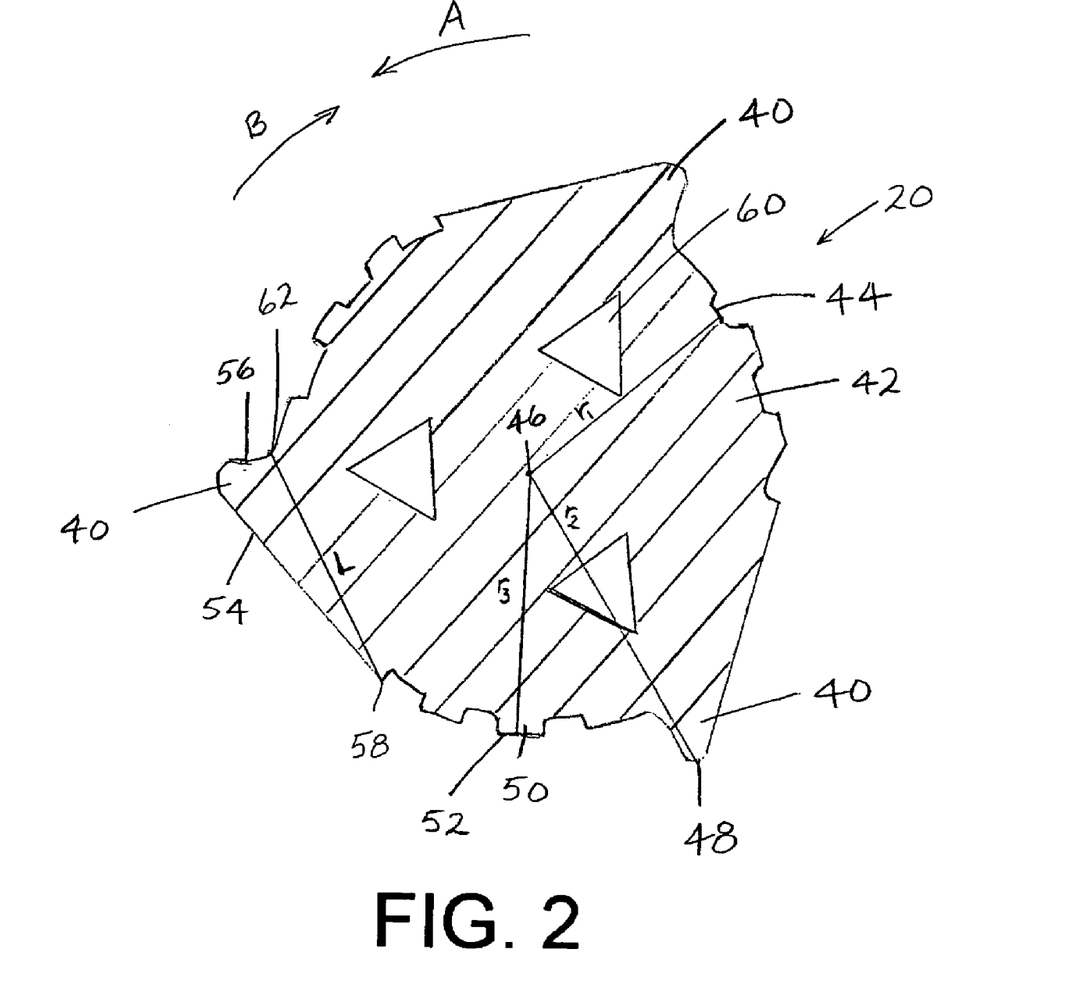
FIG. 2 is an enlarged cross-sectional view of the gasket shown in FIGS. 1A and 1B.
Figure 3A:
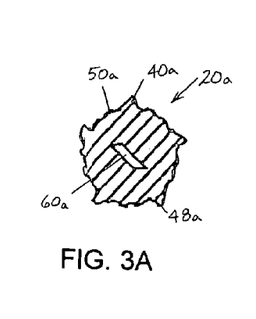
FIGS. 3A-3M are cross-sectional views of other embodiments of a gasket according to the present invention.
Figure 3B:
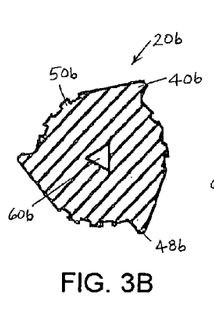
Figure 3C:
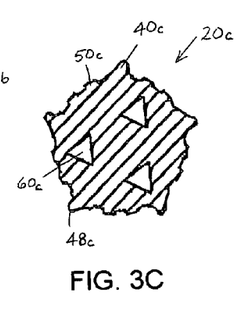
Figure 3D:
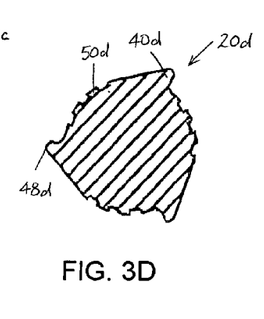
Figure 3E:
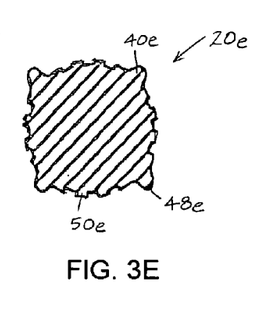
Figures 3F, 3G:
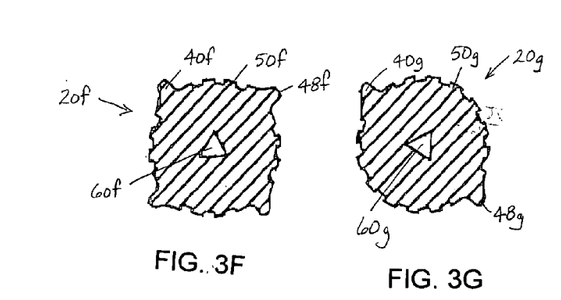
Figure 3H:
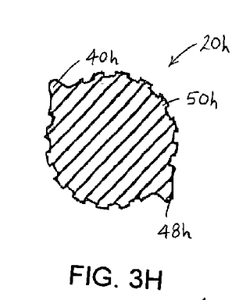
Figures 3I, 3M:
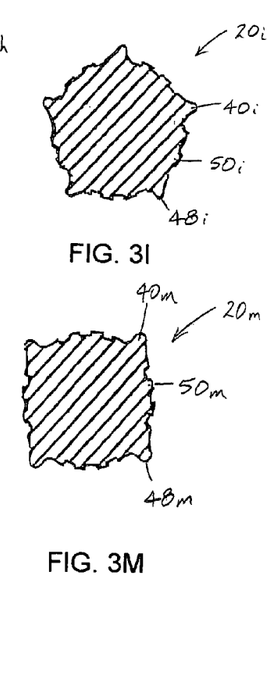
Figure 3J:
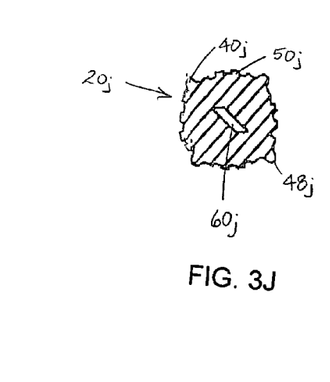
Figure 3K:
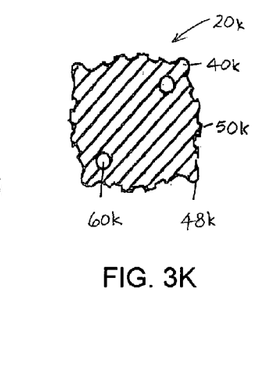
Figure 3L:
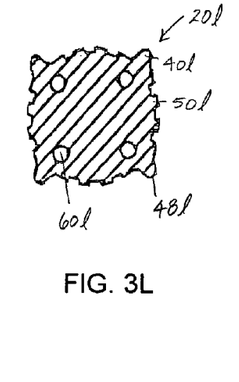

With continued reference to FIG. 2, each projection 40 includes an apex 48 that is spaced by a constant radius $r_2$ from the central axis 46 of the gasket body 42. It should be apparent that radius $r_2$ is greater than radius $r_1$. However, the radius $r_2$ is small enough so that the gasket 20 can still roll in the direction of arrow A as the spigot end is inserted in the bell end. For the embodiment in FIG. 2, the radius $r_2$ can be about 150% greater than the radius $r_1$. It should be appreciated that a larger or smaller percentage increase of $r_2$, as compared to $r_1$ is also contemplated. In alternative embodiments, the radius $r_2$ can be an approximately constant radius, or different apexes can be located at different radii from the central axis 46.

In addition to the locking projections 40, a plurality of treads 50 can also protrude away from the peripheral surface 44. The treads 50 can be spaced along the toroidal gasket body parallel to the central axis 46. They can be interposed between the projections 40. In embodiment depicted in FIG. 2, the treads 50 can have a rectangular configuration in cross section. However, other shapes are also contemplated, such as triangular, or semicircular cross sections and the like. Each tread 50 includes an outer gripping surface 52 that is spaced at a constant radius $r_3$ from the central axis 46, where $r_3$ is greater than $r_1$, and less than $r_2$. In alternative embodiments, the outer gripping surface can be spaced at an approximately constant radius from the central axis 46, or each gripping surface can be spaced at different radii from the central axis. The gripping surface 52 engages the outer surface 22 of the spigot end 10 or the inner surface 24 of the bell end 14 to encourage the rotation of the gasket 20, especially for smooth surfaced pipes, such as plastic pipes.

The locking projections 40 shown in FIG. 2 can each have similar shapes and dimensions. Each locking projection 40 includes a leading inclined surface 54, that facilitates counter-clockwise rotation in the direction of arrow A, and an inclined trailing surface 56. Each of the surfaces 54 and 56 are inclined in a direction generally toward the rotational direction of arrow A. The leading surface 54, for the embodiment depicted in FIG. 2, extends away from an adjacent tread 50 at a leading junction 58. The trailing surface 56 extends away from an adjacent tread 50 at a trailing junction 62. In alternative embodiments, the projections 40 can extend directly from the peripheral surface 44.

The leading surface 54 can be inclined at an angle of about 10° to about 20° when measured in relation to a line L that intersects the leading junction 58 and the trailing junction 62. In contrast, the trailing surface 56 can be inclined at an angle of about 110° to about 120° when measured in relation to the line L that intersects the leading junction 58 and the trailing junction 62. The apex 48 has an interior angle, i.e. measured between the leading surface 54 and the trailing surface 56, of about 50° to about 60°. The inclined surfaces 54 and 56 of the locking projections 40 allow the gasket 20 to roll in the counter-clockwise direction of arrow A and inhibit the gasket from rolling in the clockwise direction of the arrow B. Such a configuration allows the gasket 20 to cooperate with the pipes 12 and 16 (FIGS. 1A and 1B) similar to a ratchet device, where the locking projections 40 are similar to sloping teeth of a ratchet wheel and the outer surface 22 of the spigot 10 and the inner surface 24 of the bell 14 are similar to pawls, which catch against the projections 40 to limit rotational movement of the gasket 20 in the clockwise direction of arrow B (FIG. 1A).

As mentioned above, the configuration of the gasket 20 hinders rotation in the clockwise direction and facilitates rotation in the counter-clockwise direction. As can be seen in FIG. 2, each locking projection 40 can include a relatively long inclined, shallow angle, leading surface 54 and a relatively short inclined, steep angle, trailing surface 56 that extends only a small distance from the peripheral surface 44 and/or the corresponding tread 50. The incline of the leading surface 54 is considerably less steep than the incline of the trailing surface 56. Because of the long slightly inclined leading surface 54, rotation of the gasket 20 in the direction of arrow A is somewhat unhindered. While rolling in the direction of arrow A, rotation of the gasket 20 results in the outer surface 22 of the spigot end 10 and/or the inner surface 24 of the ball end 12 moving up the leading surface 54.

Since the incline of the leading surface 54 is slight and/or the gasket 20 is compressible, the distance between the outer surface 22 of the spigot end 10 and/or the inner surface 24 of the bell end 14 and the central axis 46 of the gasket body 42 remains substantially constant. Since the trailing inclined surface 56 is perpendicular to the corresponding tread 50 and/or peripheral surface 44 or inclined downward in a direction towards arrow A, rotation in the direction of arrow B is hindered because the trailing surface can catch on either the outer surface 22 of the spigot end 10 or the inner surface 24 of the bell end 14 (FIGS. 1A and 1B) and grip the corresponding surface to hinder rotation in the direction of arrow B. To also hinder rotation in the direction of arrow B the gasket 20 can be made of a flexible material, which allows the portion of the locking lug 40 near the apex 48 to bend and grip the pipe surface as the trailing surface 56 catches against the corresponding pipe surfaces.

Since the inclined surfaces 54 and 56 of the projections 40 are oriented in a particular direction, the gasket 20 should be placed onto the spigot end 10 in a manner to allow rotation of the gasket in a desired direction. Accordingly, the gasket can be referred to as a directional gasket and an indicator, such as a colored line or the like (not shown), can be provided on the gasket body 42 so that the gasket is mounted correctly.

If desired, the gasket body 42 can include at least one annular opening, or bore, 60 extending toroidally through the gasket body. With reference to FIGS. 1A and 1B, one or more bores 60 are desirable to allow the gasket body 42 to compress as the spigot end 10 is received inside the bell end 14. It should be appreciated that the bores 60 can take a number of different configurations. They can be shaped and positioned so as to allow the gasket body 42 to compress during rolling to facilitate easier insertion of the spigot end 10 into the bell end 12.

In FIGS. 1A and 1B, the gasket 20 is mounted on the spigot end 10 and the spigot end includes a vertical shoulder surface 70 that the gasket contacts when the pipes 12 and 16 are pushed into the home position as shown in FIG. 1B. As mentioned above, the gasket 20 can include any desired number of projections. It is believed that the longer the outer surface 22 of the spigot end 10' the fewer number of locking projections or lugs 40 would be needed.

As mentioned above, the gasket 20 can be made of a flexible material or a combination of softer and harder flexible materials. In one embodiment, the locking projections 40 can be made from a flexible material that is harder, stiffer and/or less flexible than the material from which the gasket body 42 is made. In this embodiment, the locking projections 40 and the gasket body 42 can be coextruded. By providing a gasket body 40 that is more flexible than the locking projections 42, the gasket body 40 can compress during rolling to facilitate easier insertion of the spigot end 10 into the bell end 12. The locking projections 42, which are stiffer than the body 40, can catch against the pipe surfaces to inhibit "backing out."

FIGS. 3A-3M depict a number of different configurations that are contemplated for gaskets according to the present invention. However, these configurations are not meant to be exhaustive. For FIGS. 3A-3M, each reference numeral includes a suffix that corresponds to the figure number. Each gasket 20a-m can include at least two, and in some configurations, up to five or more locking lugs 40a-m. If desired, the lugs can be spaced approximately equally around the periphery of the gasket. The locking lugs can take a number of different configurations, some having more rounded apexes 48a-m than others. The gaskets can include one or more annular bores 60a, 60b, 60c, 60f, 60g, 60j, 60k, and 60l. It is evident from the figures that the bores can take a number of configurations, including parallelogram-shaped, triangular-shaped and circular shaped cross sections. Treads 50a-m can also be provided.

Figure 4A:
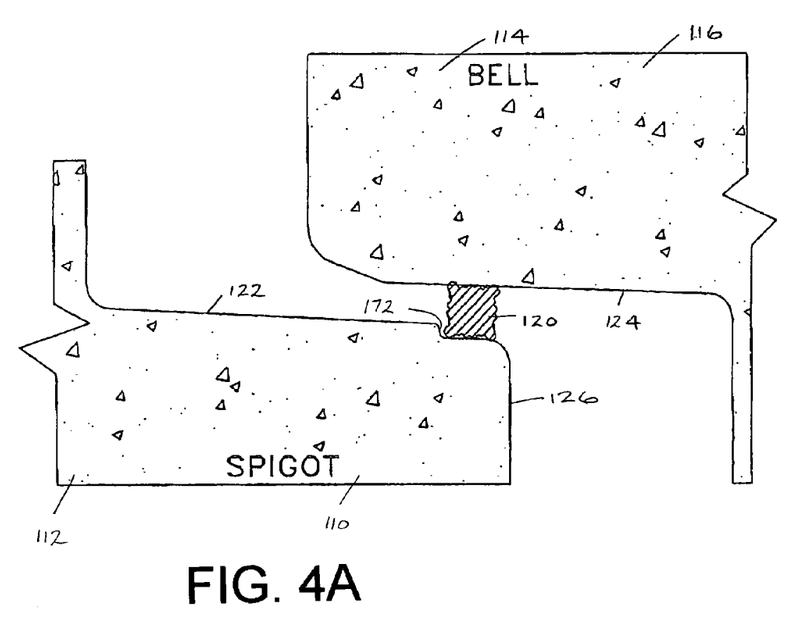
FIG. 4A is cross-sectional view of an unassembled single offset bell and spigot pipe joint depicting a spigot end of a first pipe prior to full insertion into a bell end of a second pipe, where a gasket according to another embodiment of the present invention is positioned around the spigot end.
Figure 4B:
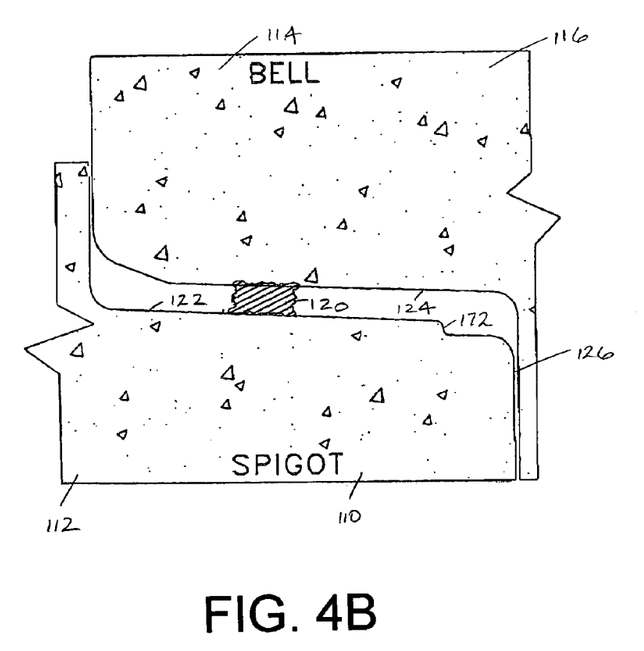
FIG. 4B is a cross-sectional view of an assembled single offset bell and spigot pipe joint in the home position where the spigot end of the first pipe is fully inserted into the bell end of the second pipe.

The gaskets described above can be used with bell and spigot joints other than the type depicted in FIGS. 1A and 1B. For example, reference will now be made to FIGS. 4A and 4B, where components of the pipe joint and gasket that are similar to FIGS. 1A and 1B will be identified by numerals that are one hundred greater than their counterpart in FIGS. 1A and 1B. In FIG. 4A, a spigot end 110 of a first pipe 112 is shown prior to receipt inside a bell end 114 of a second pipe 116. A gasket 120 is stretched around an outer surface 122 of the spigot end 110. Similar to FIG. 1A, prior to full insertion of the spigot end 110 into the bell end 114, an inner surface 124 of the bell end contacts the gasket 120. In this embodiment, however, the spigot end 110 includes a vertical shoulder 172 that is closer to an annular end 126 of the first pipe 112 as compared to the first pipe 12 shown on FIGS. 1A and 1B. In this embodiment, the gasket 120 rolls over vertical shoulder 172 as the spigot end 110 is inserted into the bell end 114.

Figure 4C:
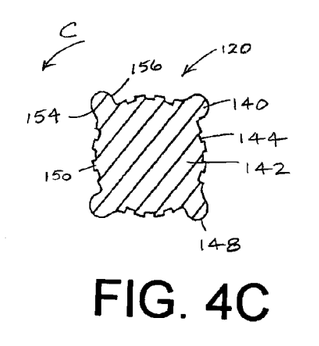
FIG. 4C is an enlarged cross-sectional view of the gasket shown in FIGS. 4A and 4B.

As is evident from FIG. 4C, locking lugs 140 that extend from a peripheral surface 144 of a gasket body 142 have a more rounded apex 148, as compared to the gasket 20 depicted in FIGS. 1A and 1B. Even though the locking lugs 140 have a more rounded apex 148 as compared to the gasket 20 depicted in FIGS. 1A and 1B, the locking lugs 140 are configured to facilitate rotation of the gasket body 142 in a first rotational direction and to inhibit rotation of the gasket body in a second rotational direction that is counter to the first rotational direction. The locking lugs 150 include an inclined leading surface 154 and an inclined trailing surface 156, similar to the locking lugs 40 depicted in FIGS. 1A and 1B, that facilitate rolling in a counter-clockwise direction depicted by arrow C when the spigot end 110 is inserted into the bell end 114 and hinder "backing out" when the pipes are pushed home. The locking lugs 150 are also flexible so that they can bend and grip the pipe surfaces to hinder the rotation involved in "backing out." Similar to the gasket 20 in FIG. 2, treads 150 can be interposed between adjacent locking lugs 140.

Figure 5A:
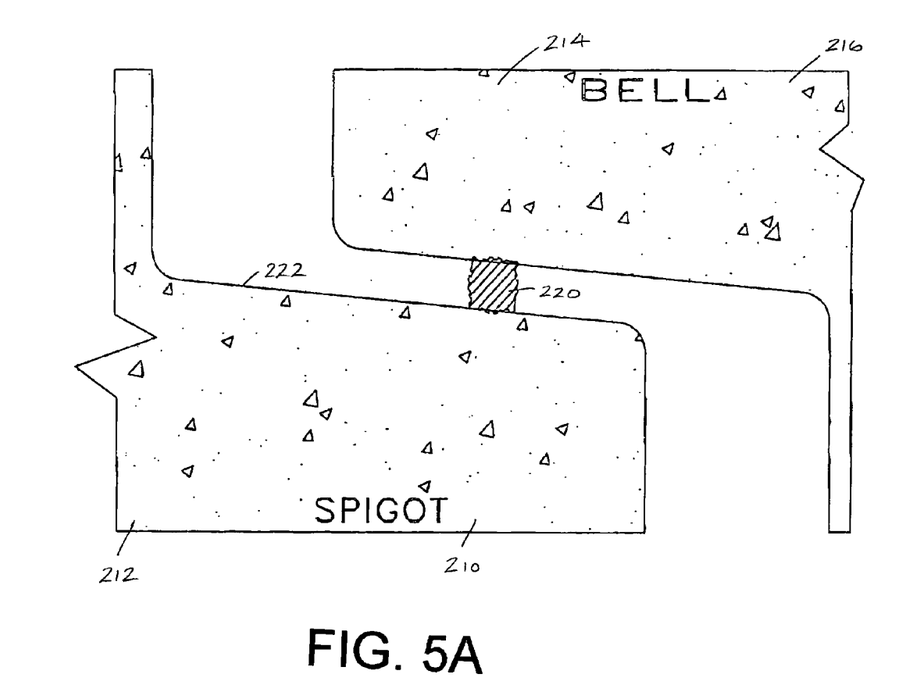
FIG. 5A is cross-sectional view of an unassembled tongue and groove bell and spigot pipe joint depicting a spigot end of a first pipe prior to insertion into a bell end of a second pipe, where a gasket according to another embodiment of the present invention is positioned around the spigot end.
Figure 5B:
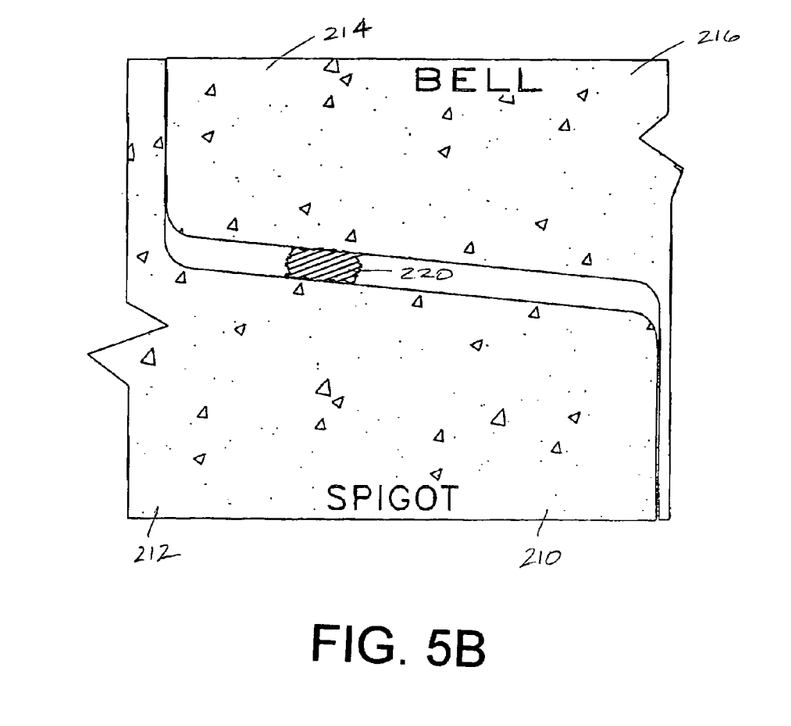
FIG. 5B is a cross-sectional view of an assembled tongue and groove bell and spigot pipe joint in the home position where the spigot end of the first pipe is fully inserted into the bell end of the second pipe.

Another example of a pipe joint is depicted in FIGS. 5A and 5B. For this embodiment, components of the pipe joint and gasket that are similar to FIGS. 1A and 1B will be referred to by numerals that are two hundred greater than their counterpart in FIGS. 1A and 1B. In this embodiment, a spigot end 210 of a first pipe 212 is received inside a bell end 214 of a second pipe 216 and a gasket 220 is stretched around an outer surface 222 of the spigot end 210. In this embodiment, the spigot end 210 does not include any vertical shoulder. The gasket 220 is shown to have a shape very similar to the gasket 120 illustrated in FIG. 4C. However, it should be appreciated that the gasket can take the form of any of the embodiments shown in FIGS. 2 and 3A-3M, as well as other configurations.

The gasket has been described with reference to particular embodiments and environments where the gasket can be used, such as various types of interconnected pipes. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A pipe gasket comprising:
   a toroidal gasket body configured to allow the gasket body to roll along a spigot end of an associated first pipe as the spigot end is received inside a bell end of an associated second pipe; and
   at least two projections extending away from a peripheral surface of the gasket body and spaced from one another around the peripheral surface, each projection including a first surface and a second surface which extend away from the peripheral surface at an angle, each first surface being inclined at a shallow angle to the peripheral surface and configured to facilitate rotation of the gasket body in a first rotational direction and each second surface being inclined at a steep angle to the peripheral surface and configured to inhibit rotation of the gasket body in a second, opposite, rotational direction, wherein each first surface is inclined in a similar direction with respect to the peripheral surface as the gasket body rolls along the spigot end of the associated first pipe.

2. The pipe gasket of claim 1, further comprising at least one tread extending from a portion of the peripheral surface interposed between adjacent projections.

3. The pipe gasket of claim 1, wherein the gasket body includes an annular bore extending through the gasket body, the bore allowing the gasket body to compress as the spigot end of the first associated pipe is received inside the bell end of the second associated pipe.

4. The pipe gasket of claim 1, wherein the gasket body comprises a first material and the projections comprise a second material that is less flexible than the first material.

5. The pipe gasket of claim 1, wherein the first surface is inclined at approximately 10° to approximately 20° and the second surface is inclined at approximately 70° to approximately 80°.

6. The pipe gasket of claim 1, wherein the at least two projections have similar dimensions.

7. The pipe gasket of claim 1, wherein the peripheral surface of the gasket body has an approximately constant radius between adjacent projections.

8. The pipe gasket of claim 1, wherein where the second surface intersects the peripheral surface the second surface being perpendicular to the peripheral surface or inclined downward in the first rotational direction with respect to the peripheral surface.

9. The pipe gasket of claim 1, wherein each second surface is inclined in a similar direction with respect to the peripheral surface as the gasket body rolls along the spigot end of the associated first pipe.

10. A directional pipe gasket for a bell and spigot pipe joint, the gasket comprising:
    a gasket body formed of a flexible material and having a peripheral surface;
    at least two locking projections extending away from the peripheral surface of the gasket body, each projection having a leading surface inclined at a shallow angle to the peripheral surface to allow a rolling of the gasket body in a first rotational direction along a spigot end of a first associated pipe as the spigot end is received inside a bell end of a second associated pipe, wherein each of the at least two locking projections has substantially the same dimensions as each other one of said at least two locking projections; and
    at least one ridge extending from the peripheral surface of the gasket body interposed between the locking projections, wherein each projection extends a greater distance from the peripheral surface than each ridge.

11. The pipe gasket of claim 10, wherein n locking projections are provided, and the projections are spaced from one another such that an angular displacement between each two adjacent projections measures about $360/n°$.

12. The pipe gasket of claim 11, wherein the n locking projections have approximately the same shape in cross section.

13. The pipe gasket of claim 10, wherein the gasket body includes an annular opening extending through the gasket body configured to allow the gasket body to compress as the spigot end of the first associated pipe is received inside the bell end of the second associated pipe.

14. The pipe gasket of claim 10, wherein the at least two locking projections are formed from a material that is stiffer than the material from which the gasket body is formed.

15. The pipe gasket of claim 10, wherein the locking projections are configured to allow the gasket body to roll along the spigot end of the pipe such that a central point of the gasket body remains at a substantially constant distance from the spigot end of the first associated pipe as the gasket body rolls along the spigot end.

16. The pipe gasket of claim 10, wherein the gasket body has a polygonal configuration in cross section.

17. A directional pipe gasket comprising:
    a toroidal gasket body having a peripheral surface that is spaced by a first substantially constant radius from an interior point of the body to facilitate rolling of the gasket body along a spigot end of a first associated pipe when the spigot end is received inside a bell end of a second associated pipe; and
    n locking projections protruding away from the peripheral surface, where n is greater than one, wherein the locking projections are angularly displaced from one another around the peripheral surface and each of the n projections includes an apex that is spaced a second substantially constant radius from the interior point of the body, wherein the second radius is greater than the first radius, but the second radius is small enough to allow the gasket body to roll along the spigot end of the first associated pipe when the spigot end is received inside the bell end of the second associated pipe, wherein the locking projections have a first surface inclined at a shallow angle with respect to the peripheral surface of the gasket body that facilitates rotation of gasket body in a first rotational direction, and the locking projections have a second surface that is opposite the first surface, the second surface being inclined at a steep angle with respect to the peripheral surface of the gasket body that inhibits rotation of the gasket body in a second rotational direction, which is opposite the first rotational direction.

18. The pipe gasket of claim 17, further comprising at least one ridge extending from the peripheral surface of the gasket body between adjacent locking projections.

19. The pipe gasket of claim 17, wherein the locking projections are angularly displaced about $360/n°$ from one another.

20. The pipe gasket of claim 17, wherein each locking projection extending from the gasket body has substantially the same configuration.

21. The pipe gasket of claim 17, wherein the gasket body has a polygonal configuration in cross section.

22. The pipe gasket of claim 17, wherein an angle at an apex of each projection is in the range of 50° to 60°.

23. The pipe gasket of claim 17, wherein the steep angle is at least twice the shallow angle.

24. The pipe gasket of claim 17, wherein each first and second surface is inclined in a similar direction with respect to the peripheral surface as the gasket body rolls along the spigot end of the associated first pipe.

* * * * *